United States Patent Office 3,076,744
Patented Feb. 5, 1963

3,076,744
ACID-POLYMERIZED AMINOPLAST RESIN
INSECTICIDAL BAIT COMPOSITION
Robert J. Geary, Vero Beach, Fla., assignor to Plant
Products Corporation, Vero Beach, Fla., a corporation
of Florida
No Drawing. Filed Mar. 21, 1961, Ser. No. 97,142
14 Claims. (Cl. 167—48)

This invention relates to the production of a novel and improved insecticidal composition, and more particularly to an insecticidal bait composition attractive to insects such as ants and the like.

Although the basic features of this invention are described below with particular reference to insecticidal baits for the control of ants, it will be understood that the compositions herein described are also effective in controlling other insects such as house, stable and fruit flies, mealy and milkweed bugs, sow bugs, Southern army and cutworms, boil weevils, roaches, grasshoppers, and the like.

The problem of control of all types of ants, including fat loving, sweet or sugar loving, and "leaf cutting" types, is a serious matter which is worldwide. Ants, like the imported fire ant which infests upwards of 23,000,000 acres in the United States alone, are obnoxious to both animals and humans. They inflict stings on animals and humans, feed upon and contaminate sources of food, build mounds which are unsightly and interfere with the operation of farm machinery, etc. For these reasons, extensive research programs have been carried out looking towards the development of methods for controlling and/or eradicating ants. Fire ants and a number of other species closely related thereto are primarily fat feeders, preferring oily or fatty animal or vegetable substances containing appreciable amounts of protein. Such ants often forage every foot of land within sixty feet from their nests, mounds or anthills in search of food. Any edible material found by the ants, including baits, is carried down into the nest and fed to the remainder of the colony or stored for future use. If a relatively fast-acting insecticidal bait is taken whereby the ants see the resulting fatal effects, they refuse to take further quantities of the material and remove from their nests any material already taken down. In some cases a nest may be completeley abandoned by a colony. Complete eradication is accordingly difficult.

A fairly effective method thus far devised for controlling ants involves broadcasting or distributing evenly over the entire infested area a bait consisting of a small amount of a slow-acting insecticide and as an attractant, an edible material such as oily or fatty animal or vegetable substances containing some protein. Such baits are in most cases in the form of a soft pasty mass difficult to handle and not adapted for wide scale broadcast application by airplane or other specialized equipment. Further, these baits are commonly subject to relatively rapid decomposition by growth of fungi and/or bacteria whereby they become unacceptable to the ants and/or the insecticide is rendered ineffective.

It is an object of this invention to provide an insecticidal bait composition which is not subject to the foregoing disadvantages. Another object of this invention is the provision of an improved insecticidal bait composition which is readily handled and/or is relatively resistant to fungi, bacteria and/or environmental conditions of weather and the like. Still another object of this invention is the provision of a method for producing such improved compositions. Other objects and advantages will appear as the description proceeds.

The attainment of the above objects is made possible by the present invention which includes the provision of an insecticidal bait composition comprising an acid-polymerized aminoplast containing molecularly occluded therein and admixed therewith an edible material attractive to insects and about 0.01 to 0.5%, by weight of the composition, of an organic insecticide. The invention also includes a method comprising forming an intimate mixture of aminoplast-forming components, an edible material attractive to insects, and about 0.01 to 0.5%, by weight of the mixture, of an organic insecticide, and then admixing therewith an acid catalyst to polymerize said aminoplast in situ. The present invention has been found to enable the provision of an insecticidal bait which is not soft, pasty, and/or subject to rapid decomposition by organisms or environmental conditions, but is instead relatively hard, resistant to such decomposition, easily handled, and readily adapted for wide scale, rapid and efficient distribution over large areas by airplane or other standard or specialized broadcasting equipment used for fertilizers, seeding, etc. Because of their desirable physical properties, the present compositions are also adapted for handling, spot applications, etc.

Hardenable aminoplast resins or polymers, and the components for forming same, are well known in the art and all are operative herein. They may be described as products of the reaction of an organic compound containing at least one amino group as one essential component, with an aldehyde compound as the second essential component or reactant. The reaction, polymerization, or hardening process is catalyzed according to the present invention by addition of an acid catalyst. Aminoplasts preferred for use herein include the following combinations:

Urea-formaldehyde
Melamine-formaldehyde
Guanidine-formaldehyde
Dicyandiamide-formaldehyde
Biuret-formaldehyde
Cyanamide-formaldehyde
Dicyandiamidine-formaldehyde
Thiourea-formaldehyde
Urea-thiourea-formaldehyde
Urea-melamine-formaldehyde In addition to the amino-containing compounds or reactants exemplified above, each of which contains at least 2 reactive N-hydrogen atoms, other substituted forms thereof may be used, such as alkyl ureas, e.g. methyl urea, ethyl urea, etc.; aryl ureas, e.g. phenyl urea, unsym. diphenyl urea, etc.; alkyl aryl ureas, e.g. unsym. methyl phenyl urea, etc.; alkyl thioureas; aryl thioureas; alkyl aryl thioureas; alkyl and aryl guanidines, e.g. diphenyl guanidine, etc.; alkyl melamines, e.g. 2,4,6-triethyltriamino-1,3,5-triazine, etc.; aryl melamines, e.g. 2,4,6-triphenyltriamino-1,3,5-triazine; etc. Mixtures of the foregoing may be employed.

In addition to formaldehyde, other aldehydes may be used in admixture therewith or in lieu thereof, such as paraformaldehyde, acetaldehyde, hexamethylenetetramine, butyraldehyde, crotonaldehyde, benzaldehyde, furfural, and the like.

The above-described amino and aldehyde aminoplast-forming reactants may be employed in any of the known molar proportions, as for example from about 0.5 to 4 moles of the aldehyde reactant per mole of amino reactant, although proportions of about 1:1 are preferred.

The lure, bait or attractant to be included in the present compositions are per se well known in the art. Any edible material attractive to the insect or variety of insects may be employed. When employed for use against one species or type of insect, an edible material particularly attractive to that insect will of course be selected. Thus, for sweet-loving ants and other insects, the edible material may be sucrose, fructose, glucose, honey, molasses, brown sugar, ground raisins and other sweet fruits, fruit syrups, Coca-Cola syrup, caro syrup, maple syrup, maple sugar, etc. Other types of insects may prefer cereals, brans or meals of various origin. As stated above, fire ants and similar types and species of insects prefer animal and vegetable oils and fats containing or combined with proteins. As examples of such edible materials, there may be mentioned beef fat, bacon, fish meals and oils, eggs, ground meat, insect pulp, meals and extracts, pork sausage, tankage (50% protein, meat and bone scraps), butter, bacon drippings, lard, vegetable protein extracts and hydrolyzates, dried brewer's solubles, tallow, cottonseed, soybean, corn, coconut, olive, palm, poppyseed, nuts and other vegetable oils, fats, meals, extracts and the like, and mixtures thereof. Peanut material, which contains considerable protein, is particularly effective, and may be used in the form of ground peanuts with or without the hulls, peanut butter, crude or refined peanut oil and the like, often combined with other fats or oils. The edible material may be employed in the present compositions in any desired proportions, generally ranging from about 0.5 to 20 parts by weight per part of the aminoplast, and preferably 1 to 6 parts per part of the aminoplast.

The organic insecticide employed in the present compositions, or mixtures of such insecticides, may be any of those known in the art, and may be effective against insects generally or specific to the insect to be eradicated. The amount of insecticide in the composition depends upon the activity thereof and the rapidity of kill desired. When a fairly rapid kill is desired, a relatively active insecticide and/or a larger amount of insecticide, such as up to 10% in the composition, should be used. This of course is only suitable with insects which feed only once on the bait and/or which are oblivious to the fatal effects of the bait on its companions. Ants, particularly fire ants, are however alert to such fatal effects and must accordingly be treated with a slow-acting, cumulative insecticide, usually in relatively small proportions in the bait ranging from about 0.01 to 0.5% and preferably from about 0.125 to 0.25%. These may be selected from among the nuclearly polychlorinated insecticides, organic phosphate insecticides, and organic carbamate insecticides. Particularly preferred is Kepone (1,2,3,5,6,7,8,9,10,10-decachlorotetracyclo[5.2.1.0$^{2.6}$.0$^{3.9}$.0$^{5.8}$]-decan - 4 - one), in addition to Heptachlor, Aldrin, Chlordane, Diazinone (O,O-diethyl O-(2 - isopropyl - 4 - methyl-6-pyrimidyl) phosphorothioate), Dieldrin, Guthion (O,O-dimethyl S-(1,2,3-benzotriazinyl-4-keto)-3-methyl phosphorodithioate), Korlan (O,O-dimethyl O-(2,4,5-trichlorophenyl) phosphorothioate), Lindane, Parathion, Sevin (1-naphthyl-N-methyl carbamate), Toxaphene, Ronnel, the organic phosphate Co-Ral, Bayer 38920, Bayer 38500, and the like. Insect sterilants (for prevention of insect reproduction) may also be termed insecticides and may be used instead of or in addition to the above-listed insecticides. Representative sterilants are mustard gas, Methotrexate or Amethopterin (N-{p[(2,4-diamino-6-pteridylmethyl)methylamino]benzoyl}glutamic acid), Chlorambucil, Aureomycin, and 1-pyrazolo(3,4-D)pyrimidine, 4-aminosulfate, and the like.

In accordance with the present invention, an intimate, substantially homogeneous mixture is prepared containing the above-described aminoplast-forming reactants, edible material and organic insecticide in suitable proportions. The mixture will usually be a soft, pasty mass, but may be in dry particulate form or a free-flowing or viscous liquid, and may be prepared with concurrent heating to melt solid fats, and with the assistance of a surface active compound functioning as a wetting, emulsifying and/or dispersing agent. Suitable surface active compounds are those of the anionic and, preferably, the non-ionic type, employed in readily ascertainable amounts as for example, from about 0.25 to 5.0% in the mixture. The anionic surface active agents are typified by the various higher molecular weight sulfates and sulfonates such as alkylaryl sulfonates, naphthalene formaldehyde sulfonates, N-higher acyl taurines, sulfates of polyoxyethylenated compounds, fatty alcohol sulfates, sulfonated fatty and polycarboxylic acids, etc. The non-ionic agents are typified by the condensation products of a plurality of moles of ethylene oxide with higher aliphatic alcohols, alkyl phenols, amines, amides, fatty acids, and other higher molecular weight hydrophobic organic compounds containing a reactive hydrogen atom, as disclosed for example in U.S. Patent 1,970,578.

To the above-described intimate mixture is then added a catalytic amount of an acidic material to polymerize or harden the aminoplast in situ in the presence of the edible material and insecticide. Suitable acid catalysts and the required amounts thereof in any particular instance for causing a rapid polymerization reaction to take place between the aminoplast-forming components are well known and readily ascertainable. As examples of such catalysts, there may be mentioned sulfuric, phosphoric hydrochloric, formic, and acetic acids and their salts with weak alkali such as ammonium. They are generally employed in amounts ranging from about 0.25 to 5.0% in the mixture, into which they are intimately mixed. Polymerization takes place readily, rapidly and without need for heat which is only optional.

By the above-described procedure, there is obtained a composition containing the aminoplast polymeric structure as a framework or carrier and the edible material-insecticide bait admixed with and molecularly occluded therein. This structure is a "clathrate" type compound which, in its physical form is sieve-like or sponge-like with the molecules of edible material and insecticide fitted into the inter-spaces of the polymer chain. By virtue of the strong physico-chemical forces between the aminoplast and the bait, a product is obtained which is highly resistant to attack by organisms such as fungi and bacteria and by environmental conditions of temperature and weather, is readily handled and distributed, and yet permits ready access of the bait to the insects to be eradicated. In addition, the invention permits the use of highly volatile and even gaseous insecticides.

The hardening or polymerization process may be permitted to take place in forms whereby shaped bait compositions may be directly obtained. Perferably, the hardened mass is ground to granular or, other particulate form and employed as such or, less desirably, molded into an desired shape. During this grinding step, or even prior to addition of the acid catalyst, it will be understood that other usual assistants may be added such as stabilizers, amino-plast-modifying agents, dyes, pigments, odorants or deodorants, plasticizers, inert diluents such as clays, silicas and the like, etc.

All parts and proportions referred to herein and in the appended claims are by weight unless otherwise indicated. In each of the following examples, which are for illustrative purposes only and are not to be regarded as limitative, 5 parts of 37% formalin, 4 parts of urea, the indicated amounts of edible formulations, 0.125 to 0.25% of Kepone or 0.05 to 0.10% of Heptachlor by weight of the mixture, and optionally 0.5 to 1.0 parts of nonionic surface active agent (e.g. isooctyl phenol decaethylene glycol ether), are intimately mixed together, desirably with heat to melt solid fats when used. 0.5 to 1.0 part of acid catalyst (70° Bé. sulfuric) is then mixed in and the mixture allowed to harden by polymerization of the aminoplast in situ. The hardened mass is then crushed to fine particle size and spread in areas foraged by fire ants and the like to obtain the above-described improved results for control and eradication of the insects:

| Example | Parts | Edible bait formulation |
|---|---|---|
| 1 | 20 | lard. |
| 2 | 20 | beef tallow. |
| 3 | 20 | peanut oil. |
| 4 | 20 | ground unroasted peanuts without hulls. |
| 5 | 20 | fish oil. |
| 6 | 20 | soybean meal. |
| 7 | 50 | molasses (cane, beets, or citrus), and |
|   | 10 | vegetable oil (corn or peanut). |
| 8 | 10 | dehydrated alfalfa meal, and |
|   | 10 | corn oil. |
| 9 | 5 | glycerin, and |
|   | 5 | animal glue or fish glue. |
| 10 | 20 | sawdust (oak or pine), and |
|   | 20 | peanut oil. |
| 11 | 40 | fish meal (e.g. Menhaden). |
| 12 | 40 | crude bone glue. |
| 13 | 20 | ground unroasted peanuts with hulls, and |
|   | 20 | crude pork fat. |
| 14 | 20 | ground roasted peanuts with hulls, and |
|   | 20 | cottonseed oil, foots or bottoms. |
| 15 | 20 | crude beef fat, |
|   | 20 | soybean meal, and |
|   | 5 | colloidal clay (Bentonite or kaolin). |
| 16 | 20 | silica gel, and |
|   | 20 | peanut oil. |
| 17 | 15 | tankage (50% protein, meat and bone), |
|   | 15 | peanut butter. |
| 18 | 15 | tankage, |
|   | 5 | fish meal, and |
|   | 5 | cottonseed oil. |
| 19 | 10 | soybean protein, |
|   | 10 | enzyme digested corn protein, and |
|   | 5 | pork fat. |
| 20 | 20 | wheat bran, and |
|   | 20 | peanut oil. |

*Example 21*

This example was carried out as described above, with 40 parts of ground whole peanuts as the edible bait formulation, but instead of the Kepone or Heptachlor, 1 to 10%, e.g. 5%, by weight of the mixture, of mustard gas or one of the other insect sterilants described above was employed.

In preparing the above mixtures, the insecticide may be added directly, or in solution in acetone or other suitable volatile organic solvent. This invention has been disclosed with respect to certain preferred embodiments, and other modifications and variations thereof obvious to persons skilled in the art are to be included within the spirit and purview of this invention and the scope of the appended claims.

I claim:

1. A substantially homogeneous insecticidal bait composition comprising an acid-polymerized aminoplast resin containing molecularly occluded therein and admixed therewith an edible material attractive to insects and an organic insecticide.

2. A composition as defined in claim 1 wherein said aminoplast resin is urea-formaldehyde.

3. A composition as defined in claim 1 wherein said edible material is peanut material.

4. A composition as defined in claim 1 wherein said edible material is at least one member of the group consisting of animal and vegetable fats and oils.

5. A substantially homogeneous insecticidal bait composition comprising an acid-polymerized aminoplast resin containing molecularly occluded therein and admixed therewith about 0.5 to 20 parts, per part of said aminoplast, of at least one edible material selected from the group consisting of animal and vegetable fats and oils, and about 0.01 to 0.5% by weight of the composition, of an organic insecticide.

6. A composition as defined in claim 5 wherein said aminoplast resin is urea-formaldehyde.

7. A composition as defined in claim 5 wherein said edible material includes peanut material.

8. A composition as defined in claim 5 wherein said insecticide is a slow-acting insecticide employed in proportions of about 0.125 to 0.25% by weight in the composition.

9. A substantially homogeneous insecticidal bait composition comprising acid-polymerized urea-formaldehyde aminoplast resin containing molecularly occluded therein and admixed therewith about 0.5 to 20 parts, per part of said aminoplast, of an edible material containing peanut material, and about 0.125 to 0.25%, by weight of the composition, of a slow-acting organic insecticide.

10. A method comprising forming an intimate substantially homogeneous mixture consisting essentially of monomeric amine and monomeric aldehyde reactants capable of forming an aminoplast resin in the presence of an acid catalyst, an edible material attractive to insects, and an organic insecticide, and then admixing therewith an acid catalyst to polymerize said aminoplast resin in situ.

11. A method as defined in claim 10 wherein said reactants are urea and formaldehyde.

12. A method as defined in claim 10 wherein said edible material includes at least one member of the group consisting of animal and vegetable fats and oils.

13. A method as defined in claim 10 wherein said edible material is peanut material.

14. A method comprising forming an intimate substantially homogeneous mixture consisting essentially of about 1 part of a mixture of urea and formaldehyde, 0.5 to 20 parts of an edible material containing peanut material, and 0.01 to 0.5%, by weight of the mixture, of a slow-acting organic insecticide, and then admixing therewith an acid catalyst to polymerize a urea-formaldehyde aminoplast in situ.

References Cited in the file of this patent

UNITED STATES PATENTS

| 2,491,287 | Smith et al. | Dec. 13, 1949 |
| 2,535,475 | Anderson | Dec. 26, 1950 |
| 2,957,804 | Shuyler | Oct. 25, 1960 |